United States Patent

Yoshimura et al.

Patent Number: 5,306,738
Date of Patent: Apr. 26, 1994

[54] PROCESS FOR PRODUCING FLEXIBLE POLYURETHANE FOAM HAVING HIGH AIR FLOW PROPERTY

[75] Inventors: Hiroyuki Yoshimura, Shinnanyo; Yutaka Tamano; Shoji Arai, both of Tokuyama, all of Japan

[73] Assignee: Tosoh Corporation, Shinnanyo, Japan

[21] Appl. No.: 17,437

[22] Filed: Feb. 12, 1993

Related U.S. Application Data

[63] Continuation of Ser. No. 683,292, Apr. 10, 1991, abandoned.

Foreign Application Priority Data

Apr. 11, 1990 [JP] Japan ................................. 2-93972
Apr. 5, 1991 [JP] Japan ................................. 3-099814

[51] Int. Cl.$^5$ .............................................. C08G 18/20
[52] U.S. Cl. .................................. 521/117; 521/128; 521/129
[58] Field of Search ..................... 521/117, 128, 129

[56] References Cited

U.S. PATENT DOCUMENTS

| | | | |
|---|---|---|---|
| 3,912,689 | 11/1975 | Bechara et al. | 260/75 |
| 3,946,038 | 3/1976 | Mao et al. | 521/163 |
| 4,042,537 | 8/1977 | Dahm et al. | 521/128 |
| 4,189,542 | 2/1980 | Kleimann et al. | 521/129 |
| 4,234,693 | 11/1980 | Wooler | 521/129 |
| 4,305,991 | 12/1981 | Meyborg et al. | 521/128 |
| 4,431,753 | 2/1984 | Casati et al. | 521/129 |
| 5,100,927 | 3/1992 | Tamano | 521/163 |
| 5,104,907 | 4/1992 | Yoshimura | 521/128 |

FOREIGN PATENT DOCUMENTS 2627719  6/1976  Fed. Rep. of Germany .

OTHER PUBLICATIONS

Database Chemical Abstracts, vol. 103, No. 10, Abstract No. 72108j, Japanese Application 6084319 (Hitachi) May 13, 1985.
Database Chemical Abstract, vol. 113, No. 8, Abstract No. 60908p, Japanese Application 24712 (Mitsui Toatsu Chemicals) Feb. 16, 1990.

*Primary Examiner*—Morton Foelak
*Assistant Examiner*—Rachel Johnson
*Attorney, Agent, or Firm*—Oblon, Spivak, McClelland, Maier & Neustadt

[57] ABSTRACT

Process for producing a flexible polyurethane foam through reaction of a polyol with a polyisocyanate in the presence of an amine catalyst, a blowing agent, and a foam stabilizer, the amine catalyst comprising at least one of the imidazoles represented by the general formula below:

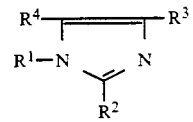

wherein $R^1$ is alkyl of 1 to 4 carbons, dimethylaminopropyl, benzyl, vinyl, or hydroxyalkyl of 1 to 3 carbons; $R^2$ is hydrogen, alkyl of 1 to 4 carbons, allyl, benzyl, or phenyl; and $R^3$ and $R^4$ are respectively hydrogen, alkyl of 1 to 4 carbons, or hydroxymethyl.

5 Claims, No Drawings

PROCESS FOR PRODUCING FLEXIBLE POLYURETHANE FOAM HAVING HIGH AIR FLOW PROPERTY

This application is a continuation of application Ser. No. 07/683,292, filed on Apr. 10, 1991, now abandoned.

BACKGROUND OF THE INVENTION

1. Field of the Invention

The present invention relates to a process for producing a flexible polyurethane foam through reaction of a polyol and a polyisocyanate in the presence of an amine catalyst, a blowing agent, and a foam stabilizer. More particularly, the present invention relates to a process for producing a flexible polyurethane foam having high air flow from a formulation employing, as the blowing agent, a decreased amount of a halogenated hydrocarbon and an increased amount of water.

2. Description of the Related Art

Flexible polyurethane foams are widely used for producing vehicle parts, furniture, bedding, cushions, and the like. Hot mold foams and cold cure mold foams, out of the flexible polyurethane foams, are widely used mainly for seat cushions for automobiles.

Generally, a hot mold foam is produced by mixing a starting liquid formulation for polyurethane composed of a polyisocyanate and a polyol containing an amine catalyst, an organometallic catalyst, a blowing agent, a foam stabilizer, and other auxiliary, then foaming the mixture in a mold kept at 30° to 40° C., post-curing it in an oven, and releasing it from the mold. Conventionally, a halogenated hydrocarbon and water are employed as the blowing agent for the hot mold foam. Usual formulation for hot mold foams for front backs and rear backs of automobiles employs from 2.0 to 4.5 parts by weight of water and from 5 to 10 parts by weight of a halogenated hydrocarbon such as CFC-11 based on 100 parts by weight of the polyol, as blowing agents.

A cold cure mold foam, which is generally called "HR foam", is produced without conducting post cure in an oven owing to the use of a highly reactive polyol. For such kinds of foams, a halogenated hydrocarbon is used to produce foams of low density and low hardness.

Recently, among the halogenated hydrocarbons, chlorofluoro carbons (CFCs) such as CFC-11 are indicated to destroy the ozone layer, so that the use of CFCs has come to be regulated and is required to be reduced throughout the world. Consequently, various investigations are being made to develop a formulation employing less CFC-11 and more water instead as the blowing agent in conventional flexible foam formulations. For the same purpose, elevation of the mold temperature up to 50° to 60° C. is also being investigated to raise the foaming efficiency.

In the production of flexible foam, however, decrease of CFC-11, increase of water, or elevation of the mold temperature disadvantageously results in rise of foam hardness, liability of giving splits in the interior of the foam, or roughening of cells at the surface of the foamed article. For the purpose of solving such problems, Japanese Patent Publication No. Sho 62-21807, and Japanese Patent Laid-Open Nos. Hei 1-259022 and Hei 2-20251 disclose increase of ethylene oxide content and increase of terminal oxyethylene groups to lower the hardness of foams, and Japanese Patent Laid-Open No. Hei 1-266121 discloses increase of an organotin catalyst and use of a higher potency foam stabilizer to improve high-temperature moldability.

However, the use of a highly reactive polyol having an increased terminal oxyethylene group, the increase of organotin catalyst or the use of a higher potency foam stabilizer will disadvantageously cause increase of the ratio of closed cells in the foam, which impairs remarkably the air flow of the foam, or may cause shrinkage of the foam.

A possible method for improving the air flow of the foam is to use, as the amine catalyst, triethylenediamine, bis(dimethylaminoethyl) ether, N-ethylmorpholine, or the like. However, the use of such an amine catalyst narrows the processing latitude, and causes the serious problem of splitting, giving no satisfactory physical properties of the foam.

Accordingly, an improved formulation for flexible polyurethane foams is desired which contains less CFC-11 and more water as the foaming agent, yet giving high moldability and high air flow.

The inventors of the present invention made comprehensive investigation from the above viewpoint regarding the catalyst in the flexible polyurethane foam formulation, regarding the catalyst in the formulation employing an increased amount of water with a highly reactive polyol having an increased amount of a terminal oxyethylene group, and found a novel fact that use of an amine having a specific chemical structure as the catalyst enables production of a flexible polyurethane foam having high air flow with improved moldability of the foam, and completed the present invention.

SUMMARY OF THE INVENTION

The present invention intends to provide a flexible urethane foam formulation which employs an increased amount of water with a highly reactive polyol having an increased amount of terminal oxyethylene group, and yet will give high air flow of the foam with improved moldability.

The present invention provides a process for producing a flexible polyurethane foam through reaction of a polyol with a polyisocyanate in the presence of an amine catalyst, a blowing agent, and a foam stabilizer, the amine catalyst comprising at least one of the imidazoles represented by the general formula below:

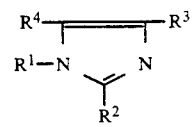

wherein $R^1$ is alkyl of 1 to 4 carbons, dimethylaminopropyl, benzyl, vinyl, or hydroxyalkyl of 1 to 3 carbons; $R^2$ is hydrogen, alkyl of 1 to 4 carbons, allyl, benzyl, or phenyl; and $R^3$ and $R^4$ are respectively hydrogen, alkyl of 1 to 4 carbons, or hydroxymethyl.

DETAILED DESCRIPTION OF THE PREFERRED EMBODIMENT

In the process of the present invention, at least one of the imidazoles represented by the general formula below is employed as a catalyst component

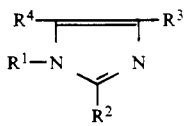

wherein $R^1$ is alkyl of 1 to 4 carbons, dimethylaminopropyl, benzyl, vinyl, or hydroxyalkyl of 1 to 3 carbons; $R^2$ is hydrogen, alkyl of 1 to 4 carbons, allyl, benzyl, or phenyl; and $R^3$ and $R^4$ are respectively hydrogen, alkyl of 1 to 4 carbons, or hydroxymethyl.

The imidazoles in the present invention include specifically 1-methylimidazole, 1,2-dimethylimidazole, 1,4-dimethylimidazole, 1,2,4,5-tetramethylimidazole, 1-methyl-2-ethylimidazole, 1,4-dimethyl-2-ethylimidazole, 1-methyl-2-isopropylimidazole, 1-methyl-2-phenylimidazole, 1-n-butyl-2-methylimidazole, 1-isobutyl-2-methylimidazole, 1-vinylimidazole, 1-benzyl-2-methylimidazole, 1-(3-dimethylaminopropyl)imidazole, and the like. Among these compounds, preferable are 1-methylimidazole, 1,2-dimethylimidazole, 1-(3-dimethylaminopropyl)imidazole, 1-n-butyl-2-methylimidazole, and 1-isobutyl-2-methylimidazole, which exhibit high catalytic activity and are highly advantageously utilized in commercial production.

The catalyst of the present invention may be used combinedly with another tertiary amine as a cocatalyst. The tertiary amine includes triethylamine, N,N-dimethylcyclohexylamine, N,N,N',N'-tetramethylethylenediamine, N,N,N',N'-tetramethylpropylenediamine, N,N,N',N'',N''-pentamethyldiethylenetriamine, N,N,N',N'',N''-pentamethyl-(3-aminopropyl)ethylenediamine, N,N,N',N'',N''-pentamethyldipropylenetriamine, N,N,N',N'-tetramethylguanidine, 1,3,5-tris(N,N-dimethylaminopropyl)hexahydro-s-triazine, 1,8-diazabicyclo 5.4.0 undecene-7, triethylenediamine, N,N,N',N'-tetramethylhexamethylenediamine, N-methyl-N'-(2-dimethylamino)ethylpiperazine, N,N'-dimethylpiperazine, N-methylpiperazine, N-methylmorpholine, N-ethylmorpholine, N,N-dimethylethanolamine, N,N-dimethylaminopropylamine, dimethylaminoethoxyethanol, N,N,N'-trimethylaminoethylethanolamine, N-trioxyethylene-N,N-dimethylamine, 1,3-bis(N,N-dimethylamino)-2-propanol, bis(2-dimethylaminoethyl) ether, and the like. Among the above tertiary amines, preferable are triethylenediamine, N-methyl-N'-(2-dimethylamino)ethylpiperazine, bis(2-dimethylaminoethyl) ether, N-methylmorpholine, and N-ethylmorpholine. Further, organic carboxylic acid salts of the aforementioned imidazoles and organic carboxylic acid salt of the aforementioned tertiary amines may properly be used as the catalyst or cocatalyst within the range in which the catalytic function of the present invention is not lost.

The catalyst of the present invention may be prepared from the above-mentioned imidazole singly or from a mixture of the imidazole and another amine catalyst. In the preparation from the mixture, a solvent such as dipropylene glycol, ethylene glycol, 1,4-butanediol, water, and the like may be used if necessary as the solvent. The amount of the solvent is not specially limited, but preferably not more than 70% of the total amount of the catalyst. The catalyst prepared in such a manner may be used by adding to the polyol. Various amine catalysts may be separately added to the polyol.

The amount of the amine catalyst used in the present invention is generally in the range of from 0.01 to 5.0 parts by weight, preferably from 0.05 to 3.0 parts by weight based on 100 parts by weight of the polyol. If the amount of the amine catalyst used is less than 0.05 parts by weight, the closed cell ratio becomes high and the foam comes to shrink. On the other hand, if the amount of the amine catalyst used is more than 3.0 parts by weight, splitting and the moldability is remarkably impaired.

In the present invention, the above-mentioned amine catalyst and an organometallic catalyst may be used in combination. The organometallic catalyst includes stannous diacetate, stannous dioctoate, stannous dioleate, stannous dilaurate, dibutyltin oxide, dibutyltin diacetate, dibutyltin dilaurate, dibutyltin dichloride, dioctyltin dilaurate, lead octanoate, lead naphthenate, nickel naphthenate, cobalt naphthenate, and the like. Among these organometallic catalysts, preferable are organotin catalysts, more preferable are stannous dioctoate, and dibutyltin dilaurate. The amount of the organometallic catalyst to be used in the present invention is normally in the range of from 0.01 to 5.0 parts by weight, preferably from 0.05 to 3.0 parts by weight based on 100 parts by weight of the polyol. If the amount of the organometallic catalyst used is not more than 0.05 parts by weight, cracks are liable to develop in the foam. If the amount thereof is not less than 3.0 parts by weight, the foam will shrink.

The polyol used in the present invention contains at least 5%, preferably 10% by mol of the terminal oxyethylene group in total terminal hydroxyl groups, and having a hydroxyl value in the range of from 10 to 90 mgKOH/g, preferable from 15 to 70 mgKOH/g, although not limited thereto.

The polyol useful in the present invention includes known polyetherpolyols, polyesterpolyols, and polymer polyols, preferably polyetherpolyols and polymer polyols, and mixtures thereof. The polyetherpolyol is prepared by reacting an alkylene oxide such as ethylene oxide and propylene oxide onto a compound having at least two or more active hydrogens such as polyhydric alcohols, e.g., ethylene glycol, propylene glycol, glycerin, trimethylolpropane, pentaerythritol, etc.; amines, e.g., ethylenediamine, etc.; and alkanolamines, e.g., ethanolamine, diethanolamine, etc., for example, according to the method described in "Polyurethane Handbook" (written by Gunther Ortel, pages 42–53). The polymer polyols include, for example, reaction products of the aforementioned polyetherpolyol with an ethylenic unsaturated monomer in the presence of a radical polymerization initiator, such as those polymer polyol describe in "Polyurethane Handbook" (written by Gunther Ortel, pages 75 and 76).

The polyisocyanate employed in the present invention may be any of known organic polyisocyanates, including aromatic polyisocyanate, such as toluene diisocyanate(TDI), 4,4'-diphenylmethane diisocyanate(MDI), naphthylene diisocyanate, xylylene diisocyanate, and the like; aliphatic polyisocyanate such as hexamethylene diisocyanate, and the like; alicyclic polyisocyanate such as dicyclohexyl diisocyanate, isophorone diisocyanate, and the like; and mixtures thereof. Among the polyisocyanate, preferable are TDI and its derivatives, and MDI and its derivatives, which may be used mixedly. The TDI and its derivatives include a mixture of 2,4-toluene diisocyanate and 2,6-toluene diisocyanate, and isocyanate-terminated TDI prepolymers. The MDI and its derivatives include a mixture of MDI and polyphenyl-polymethylene diisocyanate, namely a polymer of MDI, and/or diphenylmethane diisocyanate derivatives having a terminal isocyanate group.

The isocyanate index in the present invention is usually in the range of from 70 to 130, although the present invention is not limited to this range.

The blowing agent useful in the present invention includes water and mixtures of water with a halogenated hydrocarbon. The halogenated hydrocarbon includes halogenated methanes and halogenated ethanes such as methylene chloride, trichlorofluoromethane, dichlorodifluoromethane, dichlorotrifluoroethane, and dichloromonofluoroethane. The particularly preferred blowing agent is water. The amount of water to be used depends on the intended density of the foam, and usually not less than 2 parts by weight, preferably in the range of from 3.0 to 8.0 parts by weight based on 100 parts by weight of the polyol.

The foam stabilizer used in the present invention is a conventional organic silicone surfactant, and is used in an amount of from 0.1 to 10 parts by weight based on 100 parts by weight of the polyol.

In the present invention, a crosslinking agent or a chain extender may be added if necessary. The crosslinking agent or the chain extender includes, for example, low molecular-weight polyhydric alcohols such as ethylene glycol, 1,4-butanediol, glycerin, and the like; low molecular-weight aminepolyol such as diethanolamine, triethanolamine, and the like; and polyamines such as ethylenediamine, xylylenediamine, methylene-bis-o-chloroaniline, and the like.

Further, there may be used known additives such as a coloring agent, a flame retardant, an age resistor, and the like. The kinds and the amount of addition of such additives are used within the usually employed range according to a known procedure.

In the practice of the present invention, the mold temperature at pouring and the oven temperature for post cure are within the range usually employed in known hot mold foam production, and are not specially limited. The mold temperature at pouring is in the range of from 30° to 70° C. usually, and in the range of from 50° to 70° C. in a high mold-temperature process. The oven temperature for post cure is in the range of from 150° to 250° C. The foam is cured at this temperature of an oven for 10 to 20 minutes, and is removed from the mold to produce the hot mold foam.

In the production of flexible polyurethane foams, use of the amine catalyst of the present invention has made it possible to produce foams a having high air flow property from a flexible polyurethane foam formulation employing a decreased amount of a halogenated hydrocarbon and an increased amount of water, which has not ever been achieved readily. Further, in the hot mold formulation, it has enabled production of foams having no crack with improved moldability. Furthermore, with a formulation with an increased amount of organometallic catalyst, or in a process of a high mold-temperature process, it has enabled production of foams having high air permeability and superior in foam properties.

The present invention is described by reference to Examples and Comparative Examples. The present invention is not limited to the examples.

EXAMPLES 1–7 AND COMPARATIVE EXAMPLES 1–8

The following hot mold foam formulation was employed for the flexible polyurethane foam. The foaming tests were conducted by changing the kind of the amine catalyst under predetermined foaming conditions. The moldability and the properties of the resulting foams were measured according to the methods shown below. The results are shown in Table 1 and Table 2.

a. Formulation:
| | | |
|---|---|---|
| Polyol | 1) | 100 parts by weight |
| Foam stabilizer | 2) | 1.0 part by weight |
| Water | | 4.0 or 4.5 parts by weight |
| Organotin catalyst | 3) | Changed |
| Amine catalyst | 4) | Changed |
| Isocyanate | 5) | 105 parts by weight |

1) Polyetherpolyol: made by Sanyo Chemical Industries, Ltd., FA-708, hydroxyl value: 54 mgKOH/g,
2) Silicone surfactant: made by Toray Silicone K.K., SRX-294A,
3) Stannous dioctoate: made by Tosoh Corporation, 4) Abbreviation of catalyst in the Table:
| | |
|---|---|
| DMIZ: | 1,2-Dimethylimidazole |
| NMIZ: | 1-Methylimidazole |
| IBIZ: | Isobutyl-2-methylimidazole |
| TEDA-L33: | 33% Triethylenediamine solution in dipropylene glycol (made by Tosoh Corporation) |
| TOYOCAT-MR: | Tetramethylhexamethylenediamine (made by Tosoh Corporation) |
| TOYOCAT ET: | Bis(2-dimethylaminoethyl) ether (made by Tosoh Corporation). |

5) T-80: made by Nippon Polyurethane K.K., toluene diisocyanate.

b. Foaming conditions:
Starting material liquid temperature: 25 ± 1° C.
Stirring rate: 3000 rpm (5 seconds)
Mold for foaming: aluminum box (size: 25 × 25 × 25 cm)
Mold temperature: 45° C., and 60° C.

c. Measured items:
The items below were evaluated.
Reactivity:
| | |
|---|---|
| Cream time: | Lapse of time before start of foaming (seconds), |
| Gel time: | Time for resinification (seconds), |
| Rise time: | Lapse of time before the foam reaches its maximum foaming height. |
| Foam density: | The density was measured of the test specimen prepared by cutting the central portion of the foam in a size of 20 × 20 × 10 cm. |
| Air flow of foam: | Measured by Dow Air Flow Apparatus. |
| Moldability: | The size of splits in the internal portion of the foam was observed, and rated in five grades. |

1: Almost no cracks
2: Small
3: Medium
4: Large
5: Great

As is clear from Examples in Table 1 and Table 2, on the basis of the formulation employing a decreased amount of halogenated hydrocarbon and an increased amount of water, and at a high mold temperature, foams having high air flow with reduced internal cracks and high moldability could be produced by use of a specific imidazole as a catalyst. On the contrary, in Comparative Examples 1 to 8, use of a conventional catalyst like triethylenediamine gave foams having large cracks and low air flow. Accordingly, with conventional catalyst, the amount of halogenated hydrocarbons cannot easily be reduced by increase of water and elevation of the mold temperature.

EXAMPLES 8-11 AND COMPARATIVE EXAMPLES 9-13

The following formulation was employed for the flexible polyurethane foam. The conditions and the method of the foaming test were the same as in the aforementioned examples. The results are shown in Table 3.

a. Formulation:

| | | | |
|---|---|---|---|
| Polyol A | 6) | 100 | |
| Polyol B | 7) | 100 | |
| Polyol C | 8) | | 100 |
| Foam stabilizer | 2) | 1.0 | 1.0 | 1.0 |
| Water | | 4.0 | 5.0 | 4.0 |
| Organotin catalyst | 3) | 0.25 | 0.10 | 0.20 |
| Amine catalyst | 4) | changed | changed | changed |
| Isocyanate | 5) | 105 | 105 | 105 |

6) Polyetherpolyol A
  (a polyetherpolyol having a hydroxyl value of 56 mgKOH/g, prepared by addition-polymerization of propylene oxide to glycerin)
7) Polyetherpolyol B
  (a polyetherpolyol having a hydroxyl value of 54 mgKOH/g, and a terminal oxyethylene group ratio of 75% by mol, prepared by addition-polymerization of propylene oxide and ethylene oxide to glycerin)
8) Polyetherpolyol C
  (a polyetherpolyol having a hydroxyl value of 54 mgKOH/g, and a terminal oxyethylene group ratio of 20%, prepared by addition-polymerization of propylene oxide and ethylene oxide to glycerin)

As is clear from Table 3, on the basis of the formulation employing a decreased amount of halogenated hydrocarbon and an increased amount of water as the blowing agent, and a polyol having increased content of the terminal oxyethylene group, foams having a superior moldability and a high air flow property could be produced by use of an imidazole compound as the catalyst. On the contrary, in Comparative Examples 9 and 10, use of a conventional catalyst like triethylenediamine gave foams exhibiting low air flow. In Comparative Examples 12 and 13 in which polyols having no terminal oxyethylene group, no significant difference was observed between the catalysts.

TABLE 1

| | Example | | | | | Comparative Example | | | | | |
|---|---|---|---|---|---|---|---|---|---|---|---|
| | 1 | 2 | 3 | 4 | 5 | 1 | 2 | 3 | 4 | 5 | 6 |
| Catalyst[1] (parts by weight)*) | | | | | | | | | | | |
| NMIZ | 0.60 | 0.47 | 0.33 | — | — | — | — | — | — | — | — |
| DMIZ | — | — | — | 0.33 | — | — | — | — | — | — | — |
| IBIZ | — | — | — | — | 0.48 | — | — | — | — | — | — |
| TEDA-L33 | — | — | — | — | — | 0.45 | 0.35 | 0.23 | — | — | — |
| TOYOCAT-MR | — | — | — | — | — | — | — | — | 0.40 | 0.26 | — |
| TOYOCAT-ET | — | — | — | — | — | — | — | — | — | — | 0.12 |
| SDO[2] (parts by weight)*) | 0.10 | 0.20 | 0.30 | 0.20 | 0.20 | 0.10 | 0.20 | 0.30 | 0.10 | 0.20 | 0.30 |
| Water (parts by weight)*) | 4.0 | 4.0 | 4.0 | 4.0 | 4.0 | 4.0 | 4.0 | 4.0 | 4.0 | 4.0 | 4.0 |
| Mold Temperature (°C.) | 45 | 45 | 45 | 45 | 45 | 45 | 45 | 45 | 45 | 45 | 45 |
| Reactivity (seconds) | | | | | | | | | | | |
| Cream Time | 6 | 6 | 7 | 6 | 6 | 6 | 6 | 8 | 5 | 6 | 6 |
| Gel Time | 60 | 60 | 61 | 60 | 61 | 60 | 61 | 61 | 59 | 60 | 61 |
| Rise Time | 70 | 63 | 64 | 64 | 64 | 66 | 65 | 65 | 60 | 64 | 64 |
| Foam Properties | | | | | | | | | | | |
| Foam Density (kg/m³) | 31.1 | 30.2 | 29.1 | 30.2 | 30.8 | 40.9 | 31.2 | shrink | defoam | 40.8 | 31.9 |
| Moldability | 4 | 1 | 1 | 1 | 1 | 5 | 1 | 1 | 5 | 5 | 3 |
| Air Flow (ft³/min) | 4.5 | 3.5 | 2.0 | 3.4 | 3.3 | 1.5 | 0.5 | 0.5 | — | 1.3 | 0.6 |

[1] NMIZ: 1-Methylimidazole
DMIZ: 1,2-Dimethylimidazole
IBIZ: 1-Isobutyl-2-methylimidazole
TEDA-L33: 33% Triethylenediamine solution in dipropylene glycol (made by Tosoh Corporation)
TOYOCAT-MR: Tetramethylhexamethylenediamine (made by Tosoh Corporation)
TOYOCAT-ET: Bis(2-dimethylaminoethyl) ether (made by Tosoh Corporation)
[2] SDO: Stannous dioctoate
*) Parts by weight per 100 parts by weight of polyol

TABLE 2

| | Example | | Comparative Example | |
|---|---|---|---|---|
| | 6 | 7 | 7 | 8 |
| Catalyst[1] (parts by weight)*) | | | | |
| NMIZ | 0.33 | 0.25 | — | — |
| TEDA-L33 | — | — | 0.35 | 0.23 |
| SDO[2] (parts by weight)*) | 0.30 | 0.30 | 0.30 | 0.30 |
| Water (parts by weight)*) | 4.0 | 4.5 | 4.0 | 4.5 |
| Mold Temperature (°C.) | 60 | 45 | 60 | 45 |
| Reactivity (seconds) | | | | |
| Cream Time | 6 | 7 | 7 | 8 |
| Gel Time | 60 | 60 | 60 | 61 |
| Rise Time | 62 | 63 | 63 | 64 |
| Foam Properties | | | | |
| Foam Density (kg/m³) | 38.5 | 37.9 | 39.0 | 39.0 |
| Moldability | 1 | 1 | 5 | 3 |
| Air Flow (ft³/min) | 3.5 | 2.4 | 1.2 | 0.95 |

TABLE 3

| | Example | | | Comparative Example | | Example | | Comparative Example | |
|---|---|---|---|---|---|---|---|---|---|
| | 8 | 9 | 10 | 9 | 10 | 11 | 11 | 12 | 13 |
| Polyol (parts by weight)*) | | | | | | | | | |
| Polyol A | — | — | — | — | — | — | — | 100 | 100 |
| Polyol B | 100 | 100 | 100 | 100 | 100 | — | — | — | — |
| Polyol C | — | — | — | — | — | 100 | 100 | — | — |

TABLE 3-continued

|  | Example | | | Comparative Example | | Example | Comparative Example | | |
| --- | --- | --- | --- | --- | --- | --- | --- | --- | --- |
|  | 8 | 9 | 10 | 9 | 10 | 11 | 11 | 12 | 13 |
| Catalyst[1] (parts by weight)*) | | | | | | | | | |
| NMIZ | 0.35 | — | — | — | — | 0.39 | — | 0.40 | — |
| DMIZ | — | 0.29 | — | — | — | — | — | — | — |
| IBIZ | — | — | 0.36 | — | — | — | — | — | — |
| TEDA-L33 | — | — | — | 0.35 | — | — | 0.38 | — | 0.40 |
| TOYOCAT-ET | — | — | — | — | 0.16 | — | — | — | — |
| SDO[2] (parts by weight)*) | 0.10 | 0.10 | 0.10 | 0.10 | 0.10 | 0.20 | 0.20 | 0.25 | 0.25 |
| Water (parts by weight)*) | 5.0 | 5.0 | 5.0 | 5.0 | 5.0 | 4.0 | 4.0 | 4.0 | 4.0 |
| Mold Temperature (°C.) | 45 | 45 | 45 | 45 | 45 | 45 | 45 | 45 | 45 |
| Reactivity (seconds) | | | | | | | | | |
| Cream Time | 6 | 6 | 7 | 6 | 5 | 6 | 7 | 7 | 9 |
| Gel Time | 60 | 61 | 61 | 60 | 60 | 60 | 60 | 61 | 62 |
| Rise Time | 80 | 78 | 81 | 70 | 71 | 71 | 70 | 74 | 75 |
| Foam Properties | | | | | | | | | |
| Foam Density (kg/m$^3$) | 21.8 | 21.6 | 21.9 | 22.0 | 22.2 | 25.1 | 25.4 | 25.9 | 25.6 |
| Moldability | 1 | 1 | 1 | some shrink | 1 | 1 | 2 | 1 | 2 |
| Air Flow (ft$^3$/min) | 5.1 | 5.0 | 4.9 | 0.36 | 1.4 | 4.0 | 2.1 | 3.7 | 3.8 |

What is claimed is:

1. A process for producing a flexible polyurethane foam comprising reaction of:
   (a) a polyol with at least 5 mol% terminal oxyethylene groups;
   (b) a polyisocyanate selected from the group consisting of toluene diisocyanate and a mixture of toluene diisocyanate and diphenylmethane diisocyanate;
   (c) an amine catalyst;
   (d) a blowing agent which is water, in an amount of from 3.0 to 8.0 parts by weight based on 100 parts by weight of said polyol; and
   (e) a foam stabilizing agent;
   wherein said amine catalyst comprises at least one of the imidazoles represented by the general formula below:

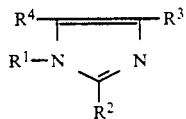

wherein $R^1$ is alkyl of 1 to 4 carbons, benzyl, vinyl, or hydroxyalkyl of 1 to 3 carbons;
   $R^2$ is hydrogen, alkyl of 1 to 4 carbons, allyl, benzyl or phenyl; and
   $R^3$ and $R^4$ are respectively hydrogen, alkyl of 1 to 4 carbons or hydroxymethyl.

2. The process for producing a flexible polyurethane foam of claim 1, wherein the catalyst comprises at least one selected from the group of compounds consisting of 1-methylimidazole, 1,2-dimethylimidazole, 1-isobutyl-2-methylimidazole, and 1-n-butyl-2-methylimidazole.

3. The process of claim 1, wherein said polyol contains at least 10 mole % terminal oxyethylene groups.

4. The process of claim 1, wherein said polyol has a hydroxyl value in the range of from 10 to 90 mgKOH/g.

5. The process of claim 1, wherein said amine catalyst is used in an amount ranging from 0.01 to 5.0 parts by weight based on 100 parts by weight of said polyol.

* * * * *